United States Patent
Uematsu et al.

[11] Patent Number: 5,903,964
[45] Date of Patent: May 18, 1999

[54] COMMON RAIL AND METHOD OF MANUFACTURING SAME

[75] Inventors: Tadahiro Uematsu, Numazu; Nobuo Kato, Sunto-gun, both of Japan

[73] Assignee: Usui Kokusai Sangyo Kaisha Limited

[21] Appl. No.: 08/856,872

[22] Filed: May 15, 1997

[30] Foreign Application Priority Data

May 22, 1996 [JP] Japan .................................. 8-150371

[51] Int. Cl.$^6$ .................................................. B23P 19/00
[52] U.S. Cl. ................. 29/456; 29/890.142; 72/367.1; 72/370.13; 285/55; 285/332; 285/386; 285/148.23
[58] Field of Search ................. 285/148.23, FOR 159, 285/382, 12, 906, 55, 332, 386; 138/44; 72/367.1, 370.12, 370.13; 29/890.142, 456

[56] References Cited

U.S. PATENT DOCUMENTS

| | | | |
|---|---|---|---|
| 855,985 | 6/1907 | Russell | 285/55 |
| 1,305,668 | 6/1919 | Rieger | 138/44 |
| 3,067,777 | 12/1962 | Briscoe | 138/44 |
| 4,298,155 | 11/1981 | Palovcik | 72/370.13 |
| 4,696,499 | 9/1987 | Butler | 285/334.4 |
| 4,747,624 | 5/1988 | Faber et al. | 285/906 X |
| 4,999,901 | 3/1991 | Toratani et al. | 29/890.142 |
| 5,261,705 | 11/1993 | Takahashi et al. | 285/334.4 X |

FOREIGN PATENT DOCUMENTS

| | | | |
|---|---|---|---|
| 415260 | 3/1991 | European Pat. Off. | 285/159 |
| 195196 | 1/1958 | Germany | 285/159 |
| 272267 | 6/1927 | United Kingdom | 285/159 |

*Primary Examiner*—Dave W. Arola
*Attorney, Agent, or Firm*—Anthony J. Casella; Gerald E. Hespos; Ludomir A. Budzyn

[57] ABSTRACT

A common rail is provided which is simple in structure and capable of connecting a piping component to a thick wall pipe thereof in a highly sealed and light weighted manner. In a common rail adapted to connect a pipe component to at least one end of a thick wall pipe having a flow passage 1' therein for accumulating pressure of high pressure fuel so that high pressure fuel is supplied from a high-pressure pump and distribute-supplied to an injection nozzle, the end portion of the thick wall pipe 1 is reduced in diameter by drawing. A thread portion 1a is formed in an outer peripheral surface of the diameter-reduced end portion. A connecting end of the piping component 3 is connected to an end portion of the thick wall pipe 1 by screwing a fastening screw means 5, 5' to the thread portion 1a.

3 Claims, 3 Drawing Sheets

PRIOR ART

PRIOR ART

COMMON RAIL AND METHOD OF MANUFACTURING SAME

BACKGROUND OF THE INVENTION

1. Field of the Invention

The present invention relates to a common rail and a method of manufacturing the same, which is adapted to accumulate pressure of fuel pressurized by a high-pressure pump so that the high-pressure fuel is supplied by controlling an opening and closing valve from an injection nozzle to a combustion chamber, and more specifically to a device for connecting the common rail with a piping component comprised of a branch pipe, a supply pipe, a blank plug, a pressure sensor, a pressure regulating valve, or the like, and a method therefore.

2. Description of the Prior Arts

High pressurization has being practiced in order to reduce particulates and NOx from a diesel engine. However, as the pressure of fuel is raised higher, more difficulty is encountered in control of timing of a fuel injection pump and a fuel injection nozzle of a fuel injection apparatus, particularly the timing of beginning and ending of injection. To cope with this, a method is proposed that fuel is previously pressurized by a high-pressure pump to accumulate the pressure of the pressurized fuel while providing a mechanically or electrically controlled opening and closing valve to an injection nozzle so that high-pressure fuel is supplied to a combustion chamber by controlling the opening and closing valve. A relatively thick walled metal pipe for the pressure accumulating chamber, in this case, is referred to as a common rail.

In the conventional common rail of this kind, as shown in FIG. 4, a thick wall pipe 1 for accumulating the pressure of high-pressure fuel has an inner peripheral surface formed with a thread 1b in which screw-fixed is a joint 2 having a thread provided in an outer peripheral surface at opposite ends of a cylindrical wall thereof. On the other hand, to the joint 2 is connected a piping component 3 comprised of a branch pipe or a supply pipe that has therein a flow passage for communication of high-pressure fuel to a high-pressure pump, a combustion chamber, or the like by means of a fastening nut 5 through a sleeve washer 4. Otherwise, as shown in FIG. 5, a fastening nut 5 is fixed by screwing through a ball 6 onto the thread 1a formed in the outer peripheral surface of the thick wall pipe 1 to form a piping component comprising a blank plug. Otherwise, as shown in FIG. 6, for connecting with a piping component 3 comprised of a pressure sensor, a pressure regulating valve, a flow limiter, or the like, connection is made by screwing a housing 5' integral with the piping component 3 or a separate fastening nut onto the thread 1a formed at the end of the thick wall pipe 1 so that communication is done to the inside of the thick wall pipe 1 by means of a cable 8 through a reinforcing coil 7.

With the conventional common rail, however, the number of parts is increased because of the necessity of a separate joint 2 for connection with a piping component such as a branch pipe or a supply pipe. Furthermore, since the structure is to connect both the thick wall pipe 1 and the piping component 3 to the joint 2, screwing portions increases in number and assembling operation becomes complicate, requiring full attention to leakage at these points. Furthermore, for connecting with a piping component such as a blank plug, a pressure sensor, a pressure regulating valve, a flow limiter, or the like, the fastening nut becomes large in size, and the area of screwing portion increases, thereby requiring sufficient attention to leakage. Furthermore, the requirement of weight-lightening for components has been not met.

SUMMARY OF THE INVENTION

The resent invention has been made in view of a present situation for the common rail of this kind as stated, and it is the object to provide a common rail and a manufacturing method thereof, which is simple in structure and capable of connecting a piping component to a thick wall pipe thereof in a highly sealed and light weighted manner.

In order to achieve the above object, a first embodiment of the present invention is characterized by a common rail adapted to connect a pipe component to at least one end of a thick wall pipe having a flow passage therein for accumulating pressure of high pressure fuel so that high pressure fuel is supplied from a high-pressure pump and distribute-supplied to an injection nozzle, the common rail comprising: at least one end portion of the thick wall pipe reduced in diameter by drawing; and a thread portion formed in an outer peripheral surface of the one end portion; wherein a connecting end of the piping component is connected to an end portion of the thick wall pipe by screwing a fastening screw means to the thread portion. It is preferred that the diameter-reduced portion drawing-formed in the at least one end portion of the thick wall pipe comprises a small diameter portion at a tip end and a taper portion continuous with the tip end, and a thread portion is formed in an outer peripheral surface of the small diameter portion at the tip end. The piping component comprises a branch pipe, a supply pipe, a blank plug, a pressure sensor, a pressure regulating valve or a flow limiter, and further the fastening screw means comprises a cap nut or a housing.

Also, a second embodiment of the present invention is characterized by a method of manufacturing a common rail comprising: a step of reducing a diameter by drawing at least one end portion of a thick wall pipe having therein a flow passage for accumulating pressure of high pressure fuel; a step of forming a thread portion in an outer peripheral surface at a tip end portion of the end portion; and a step of connecting a connecting end portion of a piping component to an end portion of the thick wall pipe by screwing a fastening screw means to the thread portion. In this case, it is preferred that the diameter-reducing forming is carried out by rolling, swaging or pressing, and further machine cutting or varnishing is made to an inner peripheral surface of the flow passage of the thick wall pipe.

DETAILED DESCRIPTION OF PREFERRED EMBODIMENTS

The present invention will be explained hereinbelow with reference to the Figures.

Figure 2:
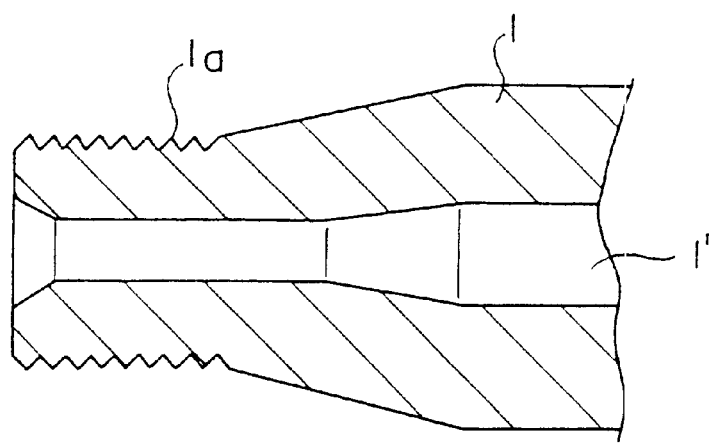
FIG. 2 is a sectional explanatory view showing a structure of an end portion of a thick wall pipe shown in FIG. 1.
Figure 3:
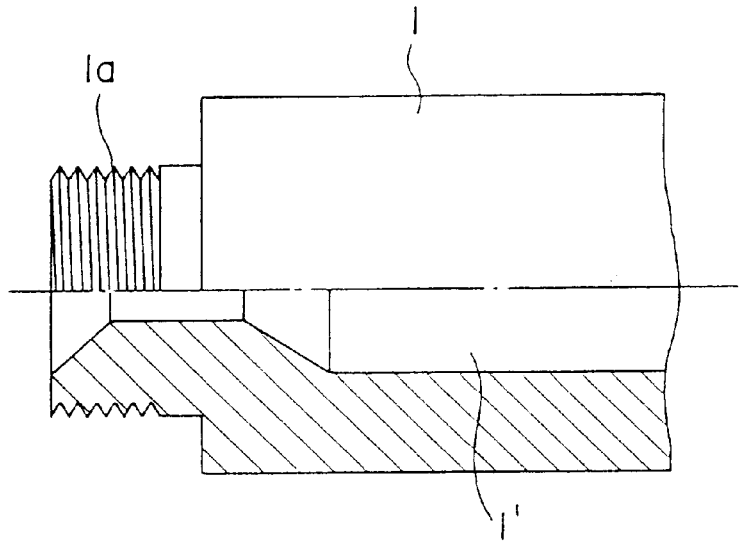
FIG. 3 is a half cutaway explanatory view showing a structure of an end portion of a thick wall pipe of another embodiment of the present invention.
Figure 4:
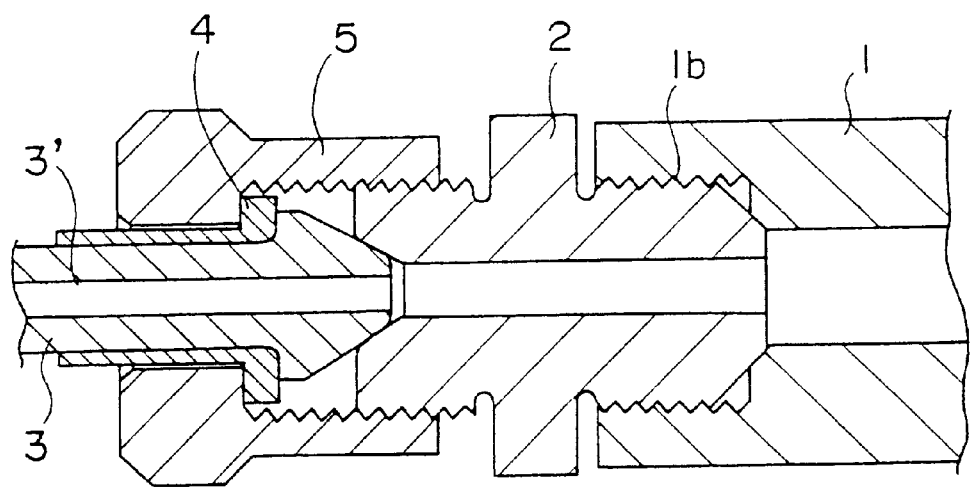
FIG. 4 is a sectional explanatory view showing a structure of branch pipe connection in a conventional common rail.

In the present invention, a metal pipe 1 as shown in FIG. 2 is formed for example of STS 480 with comparatively thick wall thickness to have a flow passage 1' at an inside thereof, which is reduced in diameter at one end portion or respective end portions by forming of drawing such as rolling, swaging or pressing. The diameter-reduced portion has a thread 1a formed in an outer peripheral surface thereof. Incidentally, where the flow passage 1' of the thick wall pipe 1 has defects such as rumples caused therein due to drawing, it is preferred that the inner peripheral surface is treated by machine cutting, varnishing or the like so as to remove such defects for providing smoothness.

Figure 1:
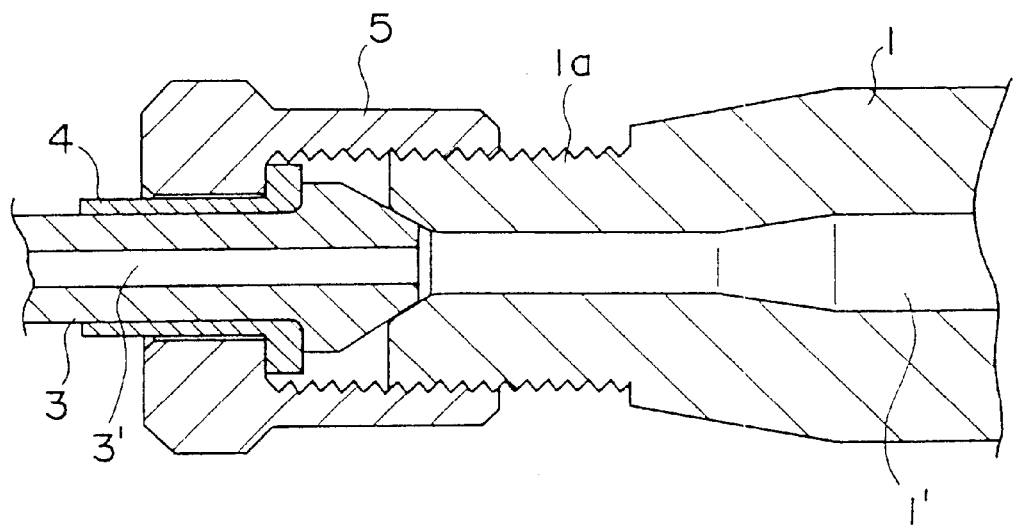
FIG. 1 is a sectional explanatory view showing a structure of an essential part of one embodiment of the present invention.

Also, as shown in FIG. 1 and FIG. 2, the diameter-reduced portion of the thick wall pipe 1 at the one end portion or the respective end portions thereof is formed such that it has a small diameter portion and a taper portion continuous with the small diameter portion. If the thread 1a is formed in the outer peripheral surface of the small diameter portion, the concentration of stress is decreased in the vicinity of the thick wall pipe 1 to thereby improve vibration resistance.

Furthermore, as shown in FIG. 1, a piping component 3 comprises a branch pipe or a supply pipe which has a flow passage 3' formed therein to communicate with a high-pressure pump, a fuel chamber or the like, which component 3 is directly connected to the end portion of the thick wall pipe 1 by screwing a nut 5 as a fastening means through a sleeve washer 4 to a thread portion 1a of the thick wall pipe 1.

Figure 5:
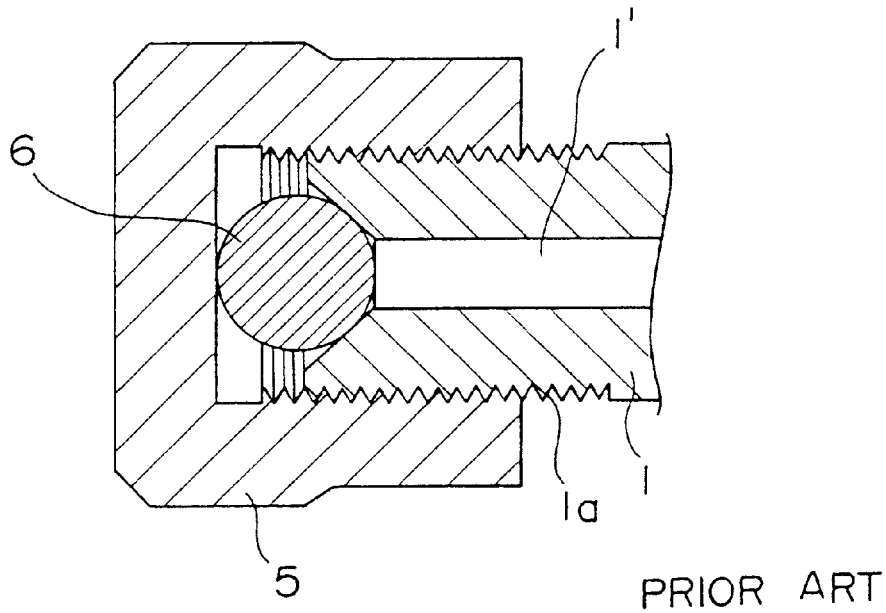
FIG. 5 is a sectional explanatory view showing a structure of blank plug connection in the conventional common rail.
Figure 6:
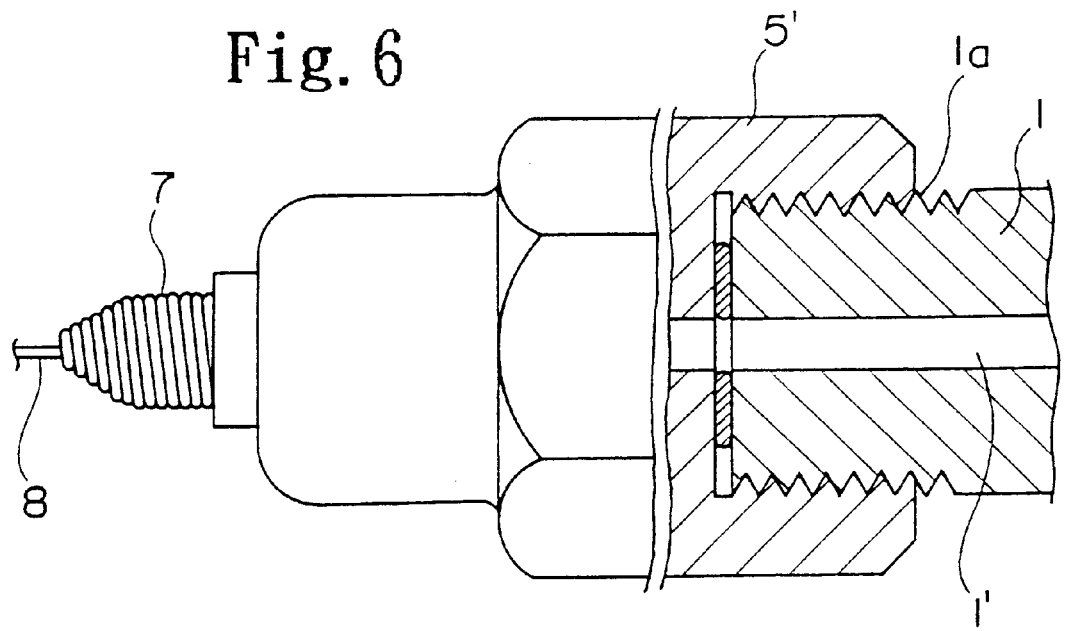
FIG. 6 is a sectional explanatory view showing a structure of sensor connection in the conventional common rail.

Also where a piping component 3 comprised of a blank plug by using a ball 9 as shown in FIG. 5 or a piping component 3 comprised of a pressure sensor, a pressure regulating valve, a flow limiter or the like is connected to an end portion of a thick wall pipe 1' since the end portion of the thick wall pipe 1 is reduced of diameter by drawing, a cap nut 5 as a fastening means for screwing on a thread provided in the outer peripheral surface of the diameter reducing portion or an inner thread at a end portion of a housing 5' can be made in small-size and light-weight, thereby fulfilling the requirement of light-weight of the entire final goods.

In the present invention thus structured, the piping component 3 can be connected to the thick wall pipe 1 with high sealability by direct fixing through a simple operation of directly screwing a small-sized and light-weighted fastening screw means 5, 5' to the thread portion 1a at one end portion or respective end portions of the thick wall pipe 1.

In this manner, according to the present invention, the piping component 3 can be connected by simple operation to at least one end of the thick wall pipe 1 with high sealability. Accordingly, high pressure fuel can be pressure accumulated in the flow passage 1' of the thick wall pipe 1 without leakage, and it can be supplied as required to a high-pressure pump, a fuel chamber, or the like through the piping component 3. Besides the number of parts is reduced to lower manufacture cost, it is possible to use a fastening screw means such as a nut 5 or a housing 5' that is small in size and light in weight.

In this manner, according to the present invention, a common rail has a pipe component connected to one end portion or respective end portions of a thick wall pipe having a flow passage therein for accumulating pressure of high pressure fuel so that high pressure fuel is supplied from a high-pressure pump and distribute-supplied to an injection nozzle, the common rail comprising: at least one end portion of the thick wall pipe being reduced in diameter by drawing; a thread portion formed in an outer peripheral surface of the one end portion; wherein an connecting end of the piping component is connected to an end portion of the thick wall pipe by screwing a fastening screw means such as a nut or a housing to the thread portion. Therefore there is no necessity of a joint, requisite by the conventional art to connect a piping component such as a branch pipe, reducing the number of parts and lowering manufacturing cost. Furthermore, the direct connection of the piping component to the thick wall pipe minimizes points where leakage might occur. In addition, a nut for connecting a piping component such as a blank plug, a pressure sensor, a pressure regulating valve, a flow limiter, or the like can be small-sized and light-weighted. The screwing portion can be decreased in area to improve sealability, enabling connection with the total weight of a complete good light-weighted.

We claim:

1. A method of manufacturing a common rail comprising:

providing a thick wall pipe having an inner peripheral surface defining a flow passage for high pressure fuel, said inner peripheral surface defining an initial inside diameter, said pipe further having an outer peripheral surface defining an initial outside diameter;

deforming at least one end of the pipe for reducing the inside diameter and the outside diameter in proximity to said end while maintaining said initial inside diameter and said initial outside diameter at locations on said pipes spaced from said end, said deforming being carried out for defining a small diameter cylindrical portion adjacent said end, said small diameter cylindrical portion having substantially uniform reduced inside and outside diameters that are less than the respective initial inside and outside diameters of said pipe, said deforming further being carried out for defining a tapered portion extending from said small diameter cylindrical portion to said portions of said pipe that maintain said initial inside and outside diameters;

forming a thread portion in the outer peripheral surface of the small diameter cylindrical portion; and connecting a connecting end portion of a piping component to the small diameter cylindrical portion of the thick wall pipe by screwing a fastening screw member to the thread portion of the small diameter cylindrical portion of the thick wall pipe.

2. A method of manufacturing a common rail according to claim 1, wherein the deforming of at least one end of the pipe is carried out by a step selected from the group of steps consisting of rolling, swaging and pressing.

3. A method of manufacturing a common rail according to claim 1, wherein the inner peripheral surface of the flow passage of the thick wall pipe is rendered smooth and substantially free of defects by performing a treatment selected from the group consisting of machine cutting and varnishing.

* * * * *